United States Patent [19]

Maeda et al.

[11] Patent Number: 4,608,779
[45] Date of Patent: Sep. 2, 1986

[54] AUTOMOBILE DOOR ASSEMBLY

[75] Inventors: Tatsuo Maeda; Takeshi Konishi, both of Hiroshima, Japan

[73] Assignee: Mazda Motor Corporation, Hiroshima, Japan

[21] Appl. No.: 688,369

[22] Filed: Jan. 2, 1985

[30] Foreign Application Priority Data

Jan. 11, 1984 [JP] Japan .................. 59-2706[U]
Mar. 22, 1984 [JP] Japan .................. 59-39982[U]
Mar. 22, 1984 [JP] Japan .................. 59-2708

[51] Int. Cl.$^4$ ............................................. E05F 11/38
[52] U.S. Cl. ...................................... 49/374; 49/348; 49/440
[58] Field of Search .......................... 49/374, 348, 440

[56] References Cited

U.S. PATENT DOCUMENTS

| | | | |
|---|---|---|---|
| 2,941,838 | 6/1960 | Wernig | 49/374 |
| 3,566,540 | 3/1971 | Hewitt | 49/374 |
| 3,703,053 | 11/1972 | De Rees et al. | 49/440 |
| 4,069,617 | 1/1978 | Koike | 49/440 |
| 4,240,227 | 12/1980 | Hasler et al. | 49/374 |
| 4,417,419 | 11/1983 | Rossie et al. | 49/348 |
| 4,418,498 | 12/1983 | Wanlass et al. | 49/348 |
| 4,475,314 | 10/1984 | Faix et al. | 49/374 |
| 4,490,942 | 1/1985 | Arnheim et al. | 49/374 |
| 4,494,337 | 1/1985 | Watanabe et al. | 49/374 |
| 4,503,639 | 3/1985 | Rossie et al. | 49/374 |

FOREIGN PATENT DOCUMENTS 2165229 12/1971 France .................. 49/440
73621 8/1954 Japan .

Primary Examiner—Victor N. Sakran
Attorney, Agent, or Firm—Burns, Doane, Swecker and Mathis

[57] ABSTRACT

A door assembly for an automobile having a door body, which comprises a window sash including a pair of upright guide rail assemblies, extending upwardly from the door body in spaced relation to each other, and a top guide rail assembly extending between the upright guide rail assemblies, and a window pane adapted to be raised from and lowered into the door body and having at least a pair of upright edges and a top edge. The edges of the window pane are positioned generally inwardly of the window sash with respect to the interior of the automobile. At least one first guide shoe having a guide groove defined therein is secured to the window pane with the guide groove of the first guide shoe slidingly receiving one of the upright guide rail assemblies. At least two second guide shoes each having a guide groove defined therein, are also secured to the window pane in spaced relation to each other with the respective guide grooves of the second guide shoes slidingly receiving the other of the upright guide rail assemblies.

10 Claims, 13 Drawing Figures

AUTOMOBILE DOOR ASSEMBLY

BACKGROUND OF THE INVENTION

The present invention generally relates to an automobile door assembly and, more particularly, to a window structure in the door assembly.

In order to provide a streamlined design of an automobile body structure, it is well known to provide the automobile with so-called "flush-surfaced door assemblies". The flush-surfaced door assembly is generally known as a door assembly wherein the window sash is generally located inwardly of the window pane with respect to the interior of the automobile thereby to minimize the gaps and discontinuities which tend to be created between the window and the sash, between the sash and other portions of the automobile body structure, or between the window pane and the body structure so that the air resistance acting on the automobile can be minimized. One example of this flush-surfaced door assembly hitherto known to those skilled in the art is disclosed in, for example, U.S. Pat. No. 4,240,227, patented Dec. 23, 1980. FIG. 1 of the accompanying drawings is a reproduction taken from the above mentioned U.S. patent and illustrates a schematic cross-sectional representation of that portion of a window sash which extends generally vertically from the door body at a location distant from the hinges for the pivotable support of the door assembly. Referring to FIG. 1, the above mentioned U.S. patent discloses a window assembly for the automobile side door comprising a window frame or sash having a pair of generally parallel rails and a window pane 2 adapted to be raised and lowered to close and open the window, respectively. Each of the rails is constituted by a channel member 1 having a guide rib 3 extending in a direction generally parallel to the window pane 2, said channel member 1 opening towards the window pane 2 and positioned generally inwardly of the window pane 2 with respect to the interior of the automobile. A generally T-sectioned guide shoe 5 having a rib 6 formed integrally therewith is affixed by adhesive, or is connected by screws passing through holes in the window pane, to the window pane 2 inwardly of a respective edge thereof with the rib 6 positioned inwardly of the channel member 1. Between the respective edge of the window pane 2 and the guide rib 3, there is disposed an elastic sealing member 4 carried by the channel member 1, which sealing member 4 is sandwiched together with the guide rib 3 between the rib 6 of the guide shoe 5 and the window pane 2. In this construction, during the movement of the window pane 2 between raised and lowered positions, the window pane 2 is guided along the guide rails with the rib 6 and the peripheral edge portions of the window pane 2 sliding in contact with the guide rib 3 and the sealing member 4, respectively.

However, it has been found that the window structure disclosed in the above mentioned U.S. patent has numerous problems. By way of example, where all of the guide shoes are connected to the window pane by the use of screws passing through the holes previously defined in the window pane and then threaded into the associated guide shoes, the installation of the window panel in the door body tends to be complicated resulting not only in the increased number of component parts but also in the increased number of the installing procedures because the guide shoes are provided not only on the front rail, but also on the rear rail, it being to be noted that the terms "front" and "rear" herein used are in relation to the longitudinal sense of the automobile body structure.

On the other hand, where all of the guide shoes associated with the front and rear rails are secured by adhesive to the window pane, the installation of the window pane tends to become complicated and time-consuming. Specifically, considering the customary installing practice wherein the window pane is installed generally after the door body has been assembled with inner and outer door panels firmly connected together and wherein the installation of the window pane in the complete door assembly is carried out generally by inserting the window pane from above into a relatively narrow slot defined between the inner and outer door panels, the presence of the guide shoes on the window pane will provide an obstruction to the insertion of the window pane into the door body through the relatively narrow slot. Moreover, if the window pane is twisted during the insertion thereof into the door body through the slot, a difficulty will be encountered in making the guide shoes engage the front and rear rails properly.

Apart from the above, it is well known to those skilled in the art that, during high speed drive of the automobile, a region of negative pressure is created at various locations along and exteriorly of the automobile body structure. If this negative pressure is excessive, it may happen that the automobile door assembly will be "sucked" outwardly with respect to the interior of the automobile in a direction generally perpendicular to the door assembly by the effect of a pressure difference between the pressures inside and outside the automobile body structure, respectively. Once the door assembly is so sucked or displaced outwardly by the effect of the pressure difference, the weatherstrip used to seal the gap formed between the door assembly and that portion of the body structure which defines the opening leading to, for example, a driver's seat is undesirably deformed to break the seal.

In order to avoid the undesirable displacement of the door assemblies which would take place by the effect of the above discussed pressure difference, the Japanese Laid-open Utility Model Publication No. 56-73621, laid open to public inspection on June 16, 1981, discloses the use of a vacuum means including a vacuum pump and a plurality of suction openings communicated with the vacuum pump and defined at respective locations which will, when the door assembly is closed, be communicated with the space defined by an inner weatherstrip, secured to the body structure so as to encircle the opening leading to the driver's seat, and an outer weatherstrip secured to the door assembly. The arrangement disclosed in this Japanese publication is so designed that, during the high speed drive of the automobile, a negative pressure is created within that space to counteract with the negative pressure created exteriorly of the body structure thereby to minimize the unwanted deformation of the sealing member.

However, the arrangement disclosed in the above discussed Japanese publication is very complicated and expensive in view of the fact that pipings for connecting the suction openings with the vacuum pump must be formed in the body structure, particularly the front pillars, the center pillars, the roof rails and the like components of the body structure around the respective door assembly.

SUMMARY OF THE INVENTION

Accordingly, the present invention has been developed with a view to substantially eliminating the above discussed disadvantages and inconveniences inherent in the prior art door assemblies and has for its essential object to provide an improved flush-surfaced door assembly for an automobile, wherein the installation of the window pane can readily be carried out with no difficulty.

Another important object of the present invention is to provide an improved flush-surfaced door assembly of the type referred to above, wherein a simple and inexpensive mechanical means for preventing the door assembly from being sucked outwardly is provided.

A further object of the present invention is to provide an improved flush-surfaced door assembly of the type referred to above, which is effective to increase the rigidity of the window sash without any special arrangement required.

In order to accomplish these objects, the present invention provides a flush-surfaced door assembly for an automobile having a door body, which door assembly comprises a window sash including a pair of upright guide rail assemblies and a top guide rail assembly extending between the upright guide rail assemblies. A window pane adapted to be raised from and lowered into the door body one at a time and configured to follow the contour of the window sash has its side edges guided by the associated upright guide rail assemblies by means of guide shoes secured to the window pane.

According to one preferred embodiment of the present invention, the guide shoes associated with the front guide rail forming a part of the window sash is secured by adhesive to the window pane while the guide shoes associated with the rear guide rail also forming another part of the window sash is secured by the use of respective threaded members passing through associated holes in the window pane and threaded into the guide shoes.

BRIEF DESCRIPTION OF THE DRAWINGS

These and other objects and features of the present invention will become clear from the detailed description taken in conjunction with preferred embodiments thereof with reference to the accompanying drawings, in which.

DETAILED DESCRIPTION OF THE EMBODIMENTS

Figure 1:
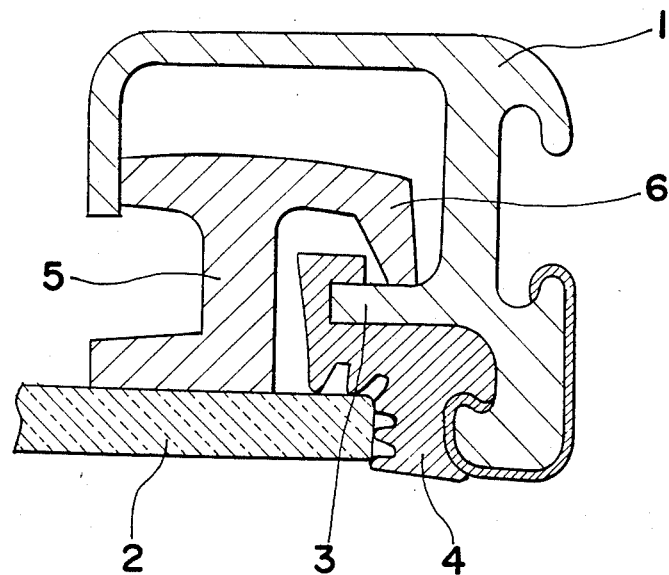
FIG. 1 is a schematic cross-sectional representation of a portion of the window sash used in the prior art door assembly.

Before the description of the present invention proceeds, it is to be noted that like parts are designated by like reference numerals throughout the accompanying drawings except for FIG. 1.

Figure 2:
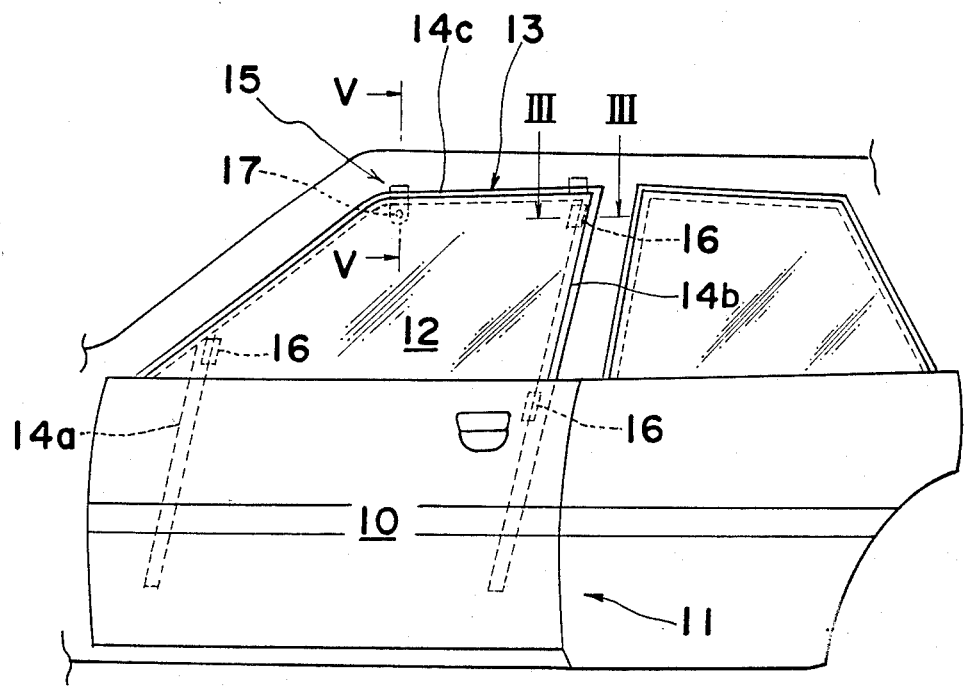
FIG. 2 is a side elevational view of a portion of the automobile body structure.

Referring first to FIG. 2 which illustrates the left front door assembly of an automobile, for example, a passenger car, the door assembly comprises a door body 10, generally constituted by a double-walled panel structure 11, and a window sash 13 protruding upwardly from the uppermost edge of the door body 10 and adapted to accommodate the edges of a window pane 12 when the latter is moved from an opened position to a closed position. It is to be noted that when the window pane 12 is in the opened position, it is substantially completely accommodated within the interior of the double-walled panel structure 11 as is well known to those skilled in the art and that the double-walled panel structure 11 accommodates therein any known window regulator for selectively lowering and raising the window pane 12 from the opened position to the closed position and from the closed position to the opened position, respectively. As will become clear from the subsequent description, the window sash 13 is generally positioned inwardly of the window pane 12 with respect to the interior of the automobile and surrounds front, top and rear edges of the window pane 12.

The window sash 13 comprises front and rear upright guide frames 14a and 14b which may be parallel to each other, and a top guide frame 14c, it being to be noted that at least a portion of the top guide frame 14c, which extends generally horizontally, is provided with a door retainer 15 for inhibiting the door assembly 10 including the window pane 12 from being outwardly displaced or pulled by the effect of a negative pressure developed along the outer surface of the door assembly during a high speed drive of the automobile.

The window pane 12 having its front and rear edges slidably and sealingly received in the front and rear guide frames 14a and 14b for movement between the closed and opened positions has a plurality of, for example, three, guide shoes 16 secured thereto, and also has a hook block 17 secured to the top edge thereof for engagement with the door retainer 15. One of the guide shoes 16 secured to the window pane 12 is positioned on the front edge of the pane whereas the remaining guide shoes 16 are positioned on upper and lower portions of the rear edge of the pane 12.

Figure 3:
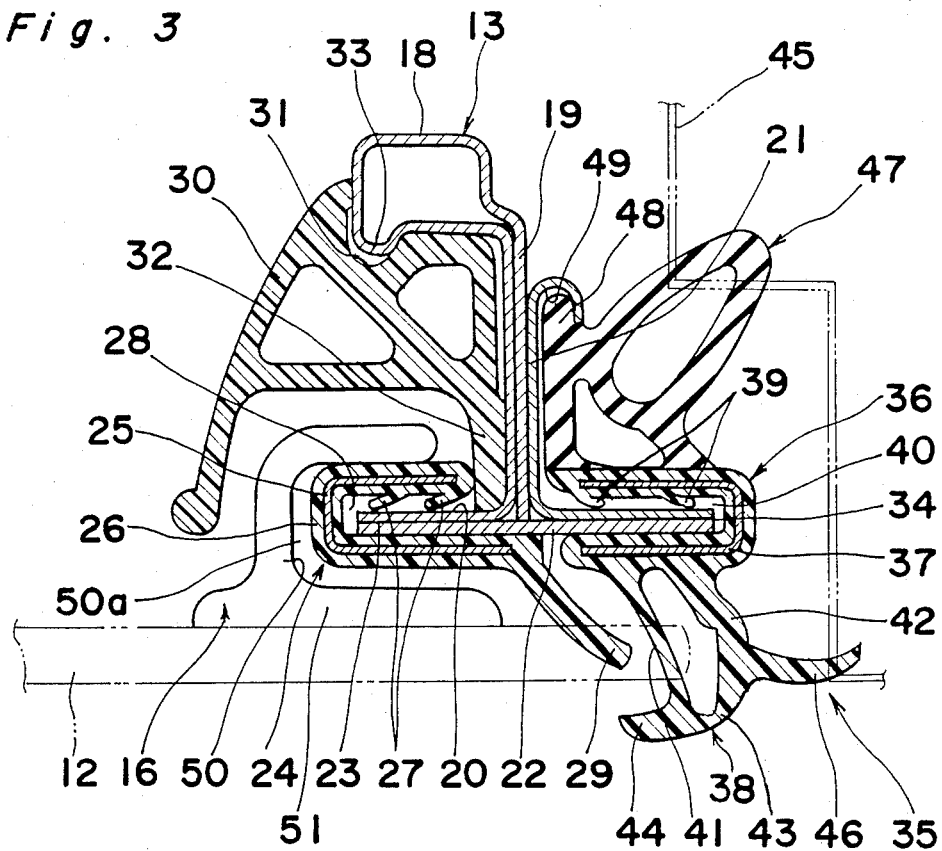
FIG. 3 is a cross-sectional view taken along the line III—III in FIG. 2.

Referring to FIG. 3 which illustrates a cross-sectional representation of the rear upright guide frame 14b taken along the line III—III in FIG. 2 when the window pane is in the closed position, the window sash 13 is constituted by (1) a generally rectangular cross-sectioned shank 18 formed by bending an elongated metal strip so as to bring its opposite side portions together in overlapped relation, (2) an intermediate rib 19 extending laterally outwardly from the shank 18 with respect to the interior of the automobile and formed by the opposite side portions of the metal strip which are overlapped with each other, and (3) a side rib 20 extending perpendicularly from the intermediate rib 19 and formed by bending one side edge of the metal strip, which projects from the other side edge thereof, perpendicularly so as to extend generally in parallel to the inner surface of the window pane 12. On one side of the double-layered intermediate rib 19 opposite to the direction in which the side rib 20 extends, a generally L-sectioned frame member 21 having right-angled inner and outer rims is provided with the inner rim spot-welded to the intermediate rib 19 and with the outer rim projecting in line with, but in a direction opposite to the side rib 20.

A plate member 22 of a width generally equal to the sum of the distances over which the side rib 20 and the outer rim of the L-sectioned frame member 21 protrude in the opposite directions from the intermediate rib 19 is spot-welded to the outer surfaces of the side rib 20 and the outer rim, respectively, which confronts the window pane 12, thereby to provide an inner peripheral flange 23 and an outer peripheral flange 34 relative to the circumference of the window pane 12. The inner peripheral flange 23, which is defined by the side rib 20 and one side portion of the plate member 22 spot-welded to such side rib 20, has a guide rail 24 fitted thereto. The guide rail 24 is of a generally U-shaped cross-section comprising a channel member 26 of synthetic resin having a groove 28 defined therein and also having a correspondingly cross-sectioned core-wall member 25 completely embedded therein. That portion of the channel member 26 which confronts the groove 28 and which will contact the outer rib 20 forming the inner peripheral flange 23 is formed integrally with a pair of spaced deformable lugs 27. The guide rail 24 of the construction described above is fitted to the inner peripheral flange 23 with the groove 28 receiving the flange 23 therein while firmly sandwiching the flange 23. At this time, the deformable lugs 27 are inwardly collapsed in contact with the outer rib 20 forming the part of the inner peripheral flange 23, thereby avoiding any possible ready separation of the guide rail 24 from the inner peripheral flange 23. The guide rail 24 also has a seal lip 29 integrally formed with the resin channel member 26 so as to project laterally outwardly for sliding engagement with the inner surface of the window pane 12 and, at the same time, for elastically urging the window pane 12 in a direction outwardly with respect to the interior of the automobile.

A garnish moulding 30 has an engagement recess 31 defined therein and is integrally formed with a fitting lug 32 which is, when the garnish moulding 30 is set in position with the recess 31 receiving a protrusion formed at 33 in the shank 18, firmly sandwiched between the intermediate rib 19 and the guide rail 24. Specifically, the mounting of the garnish moulding 30 is carried out prior to the fitting of the guide rail 24 so that, after the garnish moulding 30 is thrusted laterally into a space defined by the shank 18, the intermediate rib 19 and the inner peripheral flange 23 with the recess 31 receiving therein the protrusion 33, the guide rail 24 is fitted to the flange 23 so as to sandwich the latter firmly and, at the same time, firmly clamp the fitting lug 32 between the guide rail 24 and the intermediate rib 19.

Figure 4:
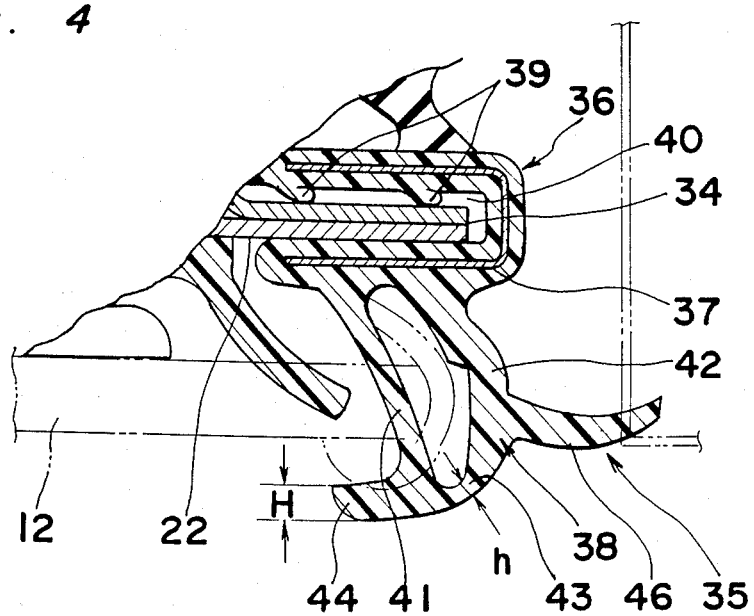
FIG. 4 is a cross-sectional view, on an enlarged scale, of a portion of a weatherstrip shown in FIG. 3.

The outer peripheral flange 34, defined by the outer rim of the frame member 21 and the other side portion of the plate member 22 which is spot-welded together with such outer rim, has a weatherstrip 35 mounted thereon. The weatherstrip 35 is of one-piece construction made of any known elastic material and comprises a channel member 36 having a groove 40 defined therein, and a sealing tongue 38 integral with the channel member 36 and extending laterally outwardly therefrom. The channel member 36 is structured in a manner similar to the channel member 26 of the guide rail 24 and, therefore, has a generally U-sectioned core-wall member 37 completely embedded therein. That portion of the channel member 36 which confronts the groove 40 and which will contact the outer rim of the frame member 21 forming the outer peripheral flange 34 is formed integrally with a pair of spaced deformable lugs 39 as best shown in FIG. 4. The weatherstrip 35 is fitted to the window sash 13 with the channel member 36 mounted on and sandwiching firmly the outer peripheral flange 34 in a manner similar to the guide rail 24. With the weatherstrip 35 so fitted to the window sash 13, the sealing tongue 38 integral with the channel member 36 projects laterally outwardly therefrom in a direction towards the peripheral edges of the window pane 12 so as to encompass the window pane 12 in a manner which will now be described in detail with particular reference to FIG. 4.

Referring now to FIG. 4 which particularly shows the details of the sealing tongue 38 of the weatherstrip 35, the sealing tongue 38 is of a generally double-walled structure having a thin-walled portion 41 and a thick-walled portion 42. The thin-walled and thick-walled portions 41 and 42 extend laterally outwardly from the channel member 36 generally in spaced relation and are continued together through a thin-walled flexing region 43 of a wall thickness h defined at a location spaced a distance from the channel member 36 and on one side of the window pane 12 opposite to the interior of the automobile. The sealing tongue 38 also has integrally formed therewith a thick-walled protrusion 44 of a wall thickness H extending angularly from the thin-walled portion 41 adjacent the flexing region 43 in a direction opposite to the thick-walled portion 42, and a sealing lip 46 extending generally perpendicular to the thick-walled portion 42 in a direction opposite to the thin-walled portion 41 and also opposite to the direction in which the protrusion 44 extends.

The weatherstrip 35, particularly the sealing tongue 38, is so designed that, when the door assembly is held in a closed position closing an access opening leading to, for example, the driver's seat, the sealing lip 46 can be deformed against its elasticity to sealingly engage a peripheral frame assembly (shown by the phantom line 45 in FIG. 3) of the automobile body structure defining such access opening and that, when the window pane 12 is in the closed position regardless of the position of the door assembly, the thin-walled portion 41 can be buckled outwardly towards the thick-walled portion 42 in contact with the edges of the window pane 12 while allowing the protrusion 44 to be elastically pressed against the outer surface of the window pane 12, as shown by the phantom line in FIG. 4. The buckling of the thin-walled portion 41 accompanied by the elastic deformation of the protrusion 44 in the manner described above is possible not only because of the portion 41 being thin-walled, but also because of the presence of the flexing region 43 of reduced wall thickness substantially providing a line of pivot or hinge.

Referring back to FIG. 3, on one side of the channel member 36 of the weatherstrip 35 opposite to the sealing tongue 38, a pliable door seal member 47 is bonded to the channel member 36. This door seal member 47 has a projection 48 formed integrally therewith, which projection 48 is, when the seal member 47 is set in position bonded to the channel member 36 as shown, fittingly received in a crimped edge 49 integral with the frame member 21. The door seal member 47 so secured to the window sash 13 in the manner described above, is utilized to provide a weatherproof seal between the door assembly and the peripheral frame assembly 45 of the automobile body structure. More specifically, when the door assembly is held in a closed position, the seal member 47 is inwardly collapsed against it elasticity in contact with the peripheral frame assembly 45, thereby providing the weatherproof seal.

Each of the guide shoes 16 secured to the inner surface of the window pane 12 in any known manner, preferably in a manner as will be described later with reference to FIGS. 6 to FIG. 11, comprises a generally square base 51, secured to the window pane 12, and a generally L-sectioned guide flange 50 formed integrally with the base 51 so as to define a generally U-shaped guide groove 50a in cooperation with the base 51 for slidingly accommodating therein the guide rail 24. Accordingly, during the movement of the window pane 12 between the closed and opened position, the window pane 12 is moved with the guide shoes 16 slidingly guided by the front and rear portions of the guide rails 24 which constitute the front and rear upright guide frames 14a and 14b shown in FIG. 2.

Figure 5:
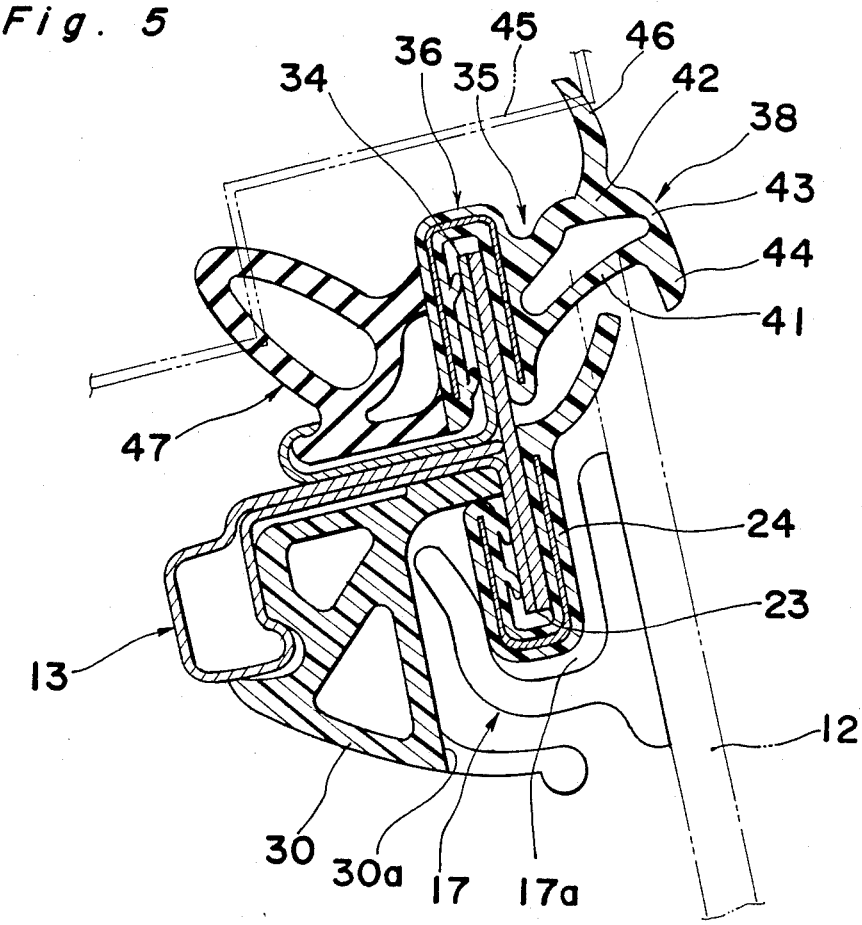
FIG. 5 is a cross-sectional view taken along the line V—V in FIG. 2.

FIG. 5 illustrates the cross-sectional representation of that portion of the top guide frame 14c which aligns with the hook block 17, taken along the line V—V in FIG. 2. The hook block 17 shown therein and secured to the inner surface of the window pane 12 adjacent the top edge thereof is similar in structure to any one of the guide shoes 16 and has a generally U-shaped groove 17a for, when the window pane 12 is moved to the closed position as shown by the phantom line, receiving therein a top portion of the guide rail 24. Accordingly, it will readily be seen that, as the window pane 12 being raised approaches the closed position with the top portion of the guide rail 24 relatively entering the groove 17a in sliding contact with the hook block 17, the window pane 12 can be drawn in a direction inwardly of the automobile thereby to resist against the tendency of the door assembly to be displaced outwardly under the influence of the negative pressure developed adjacent the outer surface of the door assembly during a high speed drive of the automobile.

It is to be noted that that portion of the garnish moulding 30 which aligns with the path of movement of the hook block 17 resulting from the movement of the window pane 12 is cut out as shown by 30a permits the passage of the hook block 17 therethrough without contacting that portion of the garnish moulding 30.

Hereinafter, the preferred manner by which any one of the guide shoes 16 is secured to the window pane 12 will be described with reference to FIGS. 6 to 11, it being, however, to be noted that in FIGS. 6 to 11, only one of the guide shoes 16 is illustrated for the sake of brevity.

Figure 6:
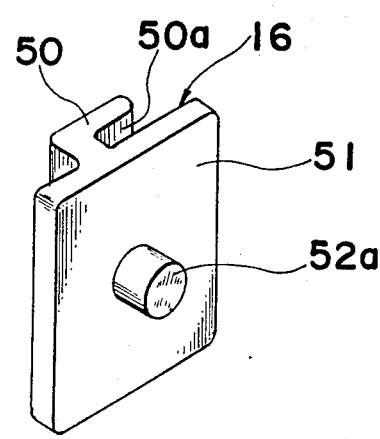
FIG. 6 is a perspective view, on an enlarged scale, of one of the guide shoes used in the door assembly according to the present invention.
Figure 7:
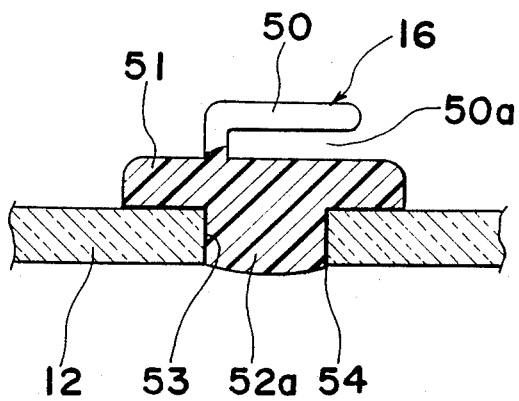
FIG. 7 is a sectional view of the guide shoe of FIG. 6 shown as secured to a window pane.

Referring first to FIGS. 6 and 7, one of the opposite surfaces of the base 51 opposite to the guide flange 50 has a control area formed integrally with a stud 52a of any suitable cross-section, preferably circular cross-section which projects from the base 51 a distance equal to the thickness of the window pane 12. On the other hand, the window pane 12 is formed with a respective bearing hole 53 of a cross-sectional shape complemental to the cross-section of the stud 52a. The guide shoe 16 shown in FIG. 6 is secured to the window pane 12 with the stud 52a inserted through the bearing hole 53 while both the surface of the base 52 and the peripheral surface of the stud 52a glued to the window pane 12 as shown by 54 representing a deposit of bonding material in FIG. 7.

Figure 8:
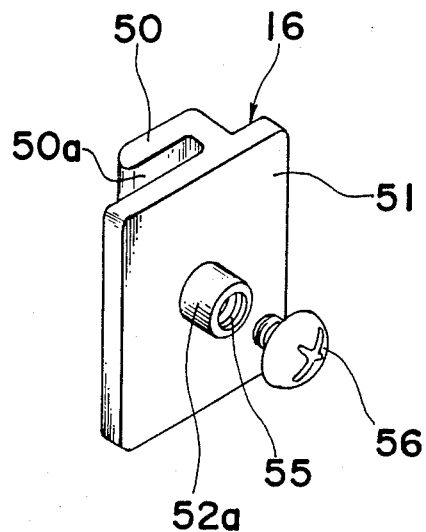
FIGS. 8 and 9 are views similar to FIGS. 6 and 7, respectively, showing a modified guide shoe.
Figure 9:
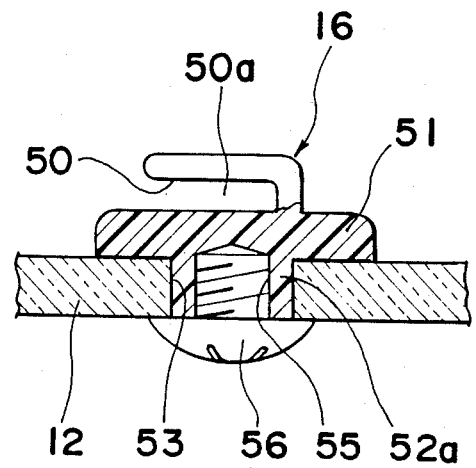

In the embodiment shown in FIGS. 8 and 9, the base 51 of the guide shoe 16 is generally identical with that shown in FIG. 6 except for the stud 52a in FIG. 8 formed with an internally threaded bore 55. The guide shoe 16 of the construction shown in FIG. 8 is secured to the window pane 12 with the stud 52a inserted through the bearing hole 53 in the window pane 12, after which a screw 56 is threaded into the bore 55 in the stud 52a from outside to lock the guide shoe 16 in position as shown in FIG. 9. In the embodiment shown in FIGS. 8 and 9, no bonding agent such as used in the embodiment of FIGS. 6 and 7, may be employed. However, to avoid any arbitrary rotation of the guide shoe 16 which would occur when the screw 56 is loosened, the stud 52a in the embodiment of FIGS. 8 and 9 is preferred to have a polygonal cross-section and so is the bearing hole 53 in the window pane 12.

Figure 10:
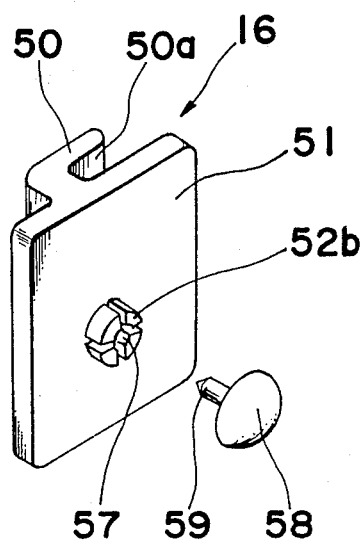
FIGS. 10 and 11 are views similar to FIGS. 6 and 7, respectively, showing a further modified guide shoe.
Figure 11:
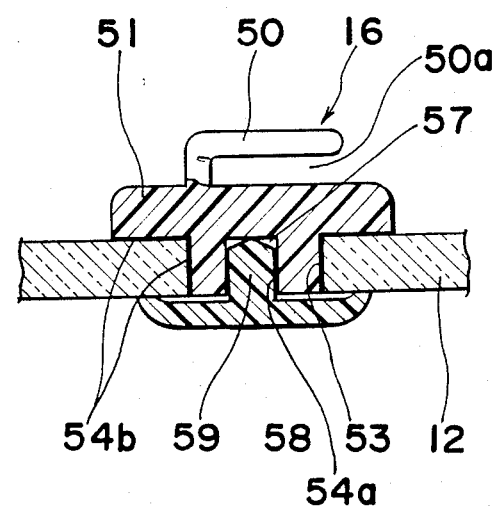

In the embodiment shown in FIGS. 10 and 11, the stud integral with the base 51 has a recess 57 defined therein and is axially splitted into four equal pieces to provide a four-piece stud 52b. After the guide shoe 16 has been secured to the window pane 12 with the stud 52b inserted through the bearing hole 53, a stem member 59 having one end integrally formed with a generally dish-shaped head 58 and having a diameter slightly greater than the diameter of the recess 57 is inserted from outside into the recess 57 and glued in position within the recess 57. Where the four-piece stud 52b as a whole has a polygonal cross-section and the bearing hole 53 is correspondingly polygonal in shape, the guide shoe 16 can be satisfactorily secured to the window pane 12 only by bonding the stem member 59 to the periphery of the recess 57 as shown by 54a representing a deposit of bonding material. However, where the four-piece stud 52b as a whole is of a circular cross-section, the use of a bonding agent shown by 54b representing a deposit thereof is recommended to rigidly connect the guide shoe 16 in a manner similar to that described with reference to and shown in FIGS. 6 and 7. It is to be noted that since the stem member 59 is of a diameter slightly greater than that of the recess 59, the insertion of the stem member 59 in the presence of the bonding layer which ultimately forms the bond deposit 54a results in the radially outward expansion of the four pieces constituting the stud 52b wherefore the latter can be firmly held within the bearing hole 53 in the form as press-fitted.

Although the use of the guide shoes 16 of the same structure is preferred for a particular model or make of automobile, the guide shoes of different structure shown in FIGS. 6 to 11 may be used in combination. In any event, the guide shoes 16 according to the present invention is advantageous in that the window pane 12 can be mounted on the door assembly either before or after the window sash 13 is mounted and fixed in position on the door body 10. Specifically, where the window pane 12 is to be mounted on the door assembly after the window sash 13 has been mounted and fixed in position on the door body 10, either one of the front guide shoe associated with the front upright guide frame 14a and the rear guide shoes associated with the rear upright guide frame 14b may be secured to the window pane 12 before the securement of the other of the front guide shoe and the rear guide shoe which is to be carried out after the window pane 12 has been set in position on the door body 10.

During the high speed drive of the automobile, it is well known that regions of negative pressure are developed at various locations adjacent the surfaces of the automobile body structure, some acting to draw not only the window panes 12 but also the door assemblies outwardly with respect to the interior of the automobile. While the tendency of the window panes 12 to be drawn outwardly by the effect of pressure difference between the interior and exterior of the automobile can be eliminated by the provision of the hook block 17 for each window pane engageable with the top portion of the guide rail 14c constituting the top guide frame 14c. The embodiment which will be subsequently described with reference to FIGS. 12 and 13 is designed to minimize or substantially eliminate the tendency of the door assembly to be drawn outwardly.

Figure 12:
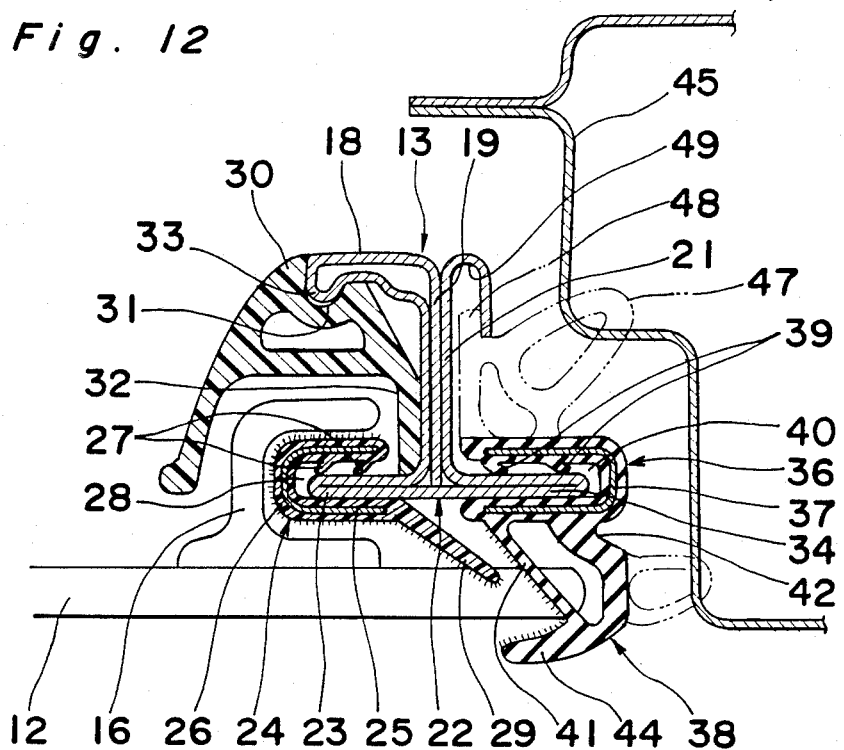
FIGS. 12 and 13 are views similar to FIGS. 3 and 5, respectively, showing another preferred embodiment of the present invention.
Figure 13:
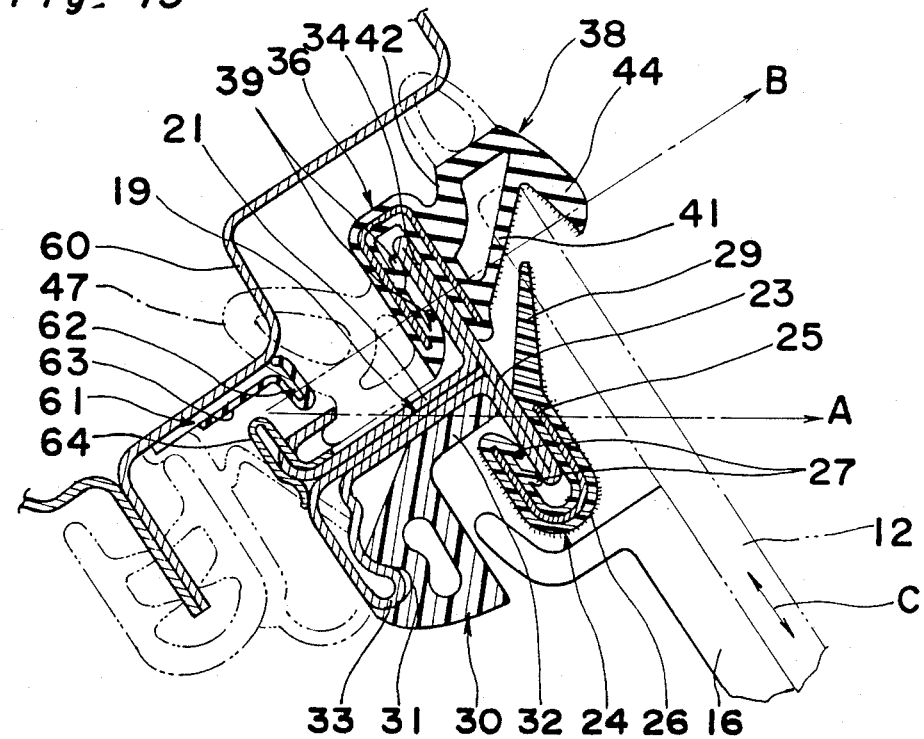

Referring now to FIGS. 12 and 13, FIG. 12 is a cross-sectional representation similar to that shown in FIG. 3 whereas FIG. 13 is a cross-sectional representation similar to that shown in FIG. 5. Comparing FIGS. 12 and 13 with FIGS. 3 and 5, it will readily be seen that the difference between the embodiment of FIGS. 3 to 5 and that of FIGS. 12 and 13 resides in the details of the top guide frame 14c and the related portion of the peripheral frame assembly of the automobile body structure, which difference is best shown in FIG. 13. As shown in FIG. 13, a top portion 60 of the peripheral frame assembly defining the access opening leading to the driver's seat has a generally L-sectioned beam member 61 having a retaining flange 62 integral therewith, which member 61 is rigidly secured by, for example, spot-welding to that top portion 60 of the peripheral frame assembly with the retaining flange 62 projecting a predetermined distance in a direction generally perpendicular to the top portion 60 of the peripheral frame assembly and confronting the access opening. For decorative purpose, the beam member 61 is coated, or otherwise lined, with a layer 63 of elastic material.

On the other hand, the top guide frame 14c (FIG. 2) is provided with an engagement flange 64 rigidly secured by, for example, spot-welding, to the top portion of the window sash 13 so as to protrude a predetermined distance in a direction generally upwardly with respect to the door assembly and in parallel to, but opposite to the direction in which the retaining flange 62 projects from the beam member 61. The engagement flange 64 is so positioned relative to the retaining flange 62 as to come inside the retaining flange 62 with respect to the interior of the automobile when and so long as the door assembly is closed. The respective predetermined distances over which the retaining flange 62 and the engagement flange 64 extend in the opposite directions are so selected that, when the door assembly is selectively opened and closed, the free end of the engagement flange 64 fast with the door assembly can pass underneath and clear of the free end of the retaining flange 62, having moved in a plane depicted by the single-dotted chain line A, but when the door assembly appears to be drawn outwardly by the effect of the previously described pressure difference with the free end of the engagement flange 64 tending to move in a plane depicted by the double-dotted chain line B, the retaining flange 62 can provide an obstruction to the passage of the engagement flange 64 thereby to retain the door assembly in the closed position. The solid line shown by C shown in FIG. 13 represents the direction of movement of the window pane 12 between the closed and opened positions.

Although the present invention has fully been described in connection with the preferred embodiments with reference to the accompanying drawings, it is to be noted that various changes and modifications are apparent to those skilled in the art. By way of example, the other door assemblies of the automobile which are not described and not shown are likewise provided with respective window structures similar or identical with that described with reference to and shown in the accompanying drawings.

Accordingly, such changes and modifications are to the understood as included within the true scope of the present invention as defined by the appended claims, unless they depart therefrom.

We claim:

1. A door assembly for an automobile having a door body, which comprises:

a window sash including a pair of upright guide rail assemblies extending upwardly from the door body in spaced relation to each other, and a top guide rail assembly extending between the upright guide rail assemblies;

a window pane adapted to be raised from and lowered into the door body and having at least a pair of upright edges and a top edge, said edges of said window pane being configured to follow the contour of the window sash defined by the upright and top guide rail assemblies, respectively, said edges of said window pane being positioned generally outwardly of the window sash with respect to the interior of the automobile;

each of said guide rail assemblies including an inner peripheral flange lying in a plane generally parallel to the window pane, and a generally U-sectioned guide rail member covered by an elastic material and having a generally U-shaped groove, said guide rail member being mounted on the window sash with said U-shaped groove receiving therein said respective inner peripheral flange;

at least one first guide shoe having a guide groove defined therein, said first guide shoe being secured to the window pane with the guide groove of said first guide shoe slidingly receiving one of the upright guide rail assemblies;

at least two second guide shoes each having a guide groove defined therein, said second guide shoes being secured to the window pane in spaced relation to each other with the respective guide grooves of said second guide shoes slidingly receiving the other of the upright guide rail assemblies; and a garnish moulding for substantially concealing the guide rail assemblies, said garnish moulding having an engagement recess defined therein and a fitting lug integrally formed therewith, said garnsih moulding being fitted to the guide rail assemblies with a protrusion of the guide rail asemblies engaging in said engagement recess and with said fitting lug firmly sandwiched between the guide rail member and the inner peripheral flange.

2. A door assembly for an automobile having a door body, which comprises:

a window sash including a pair of upright guide rail assemblies extending upwardly from the door body in spaced relation to each other, and a top guide rail assembly extending between the upright guide rail assemblies;

a window pane adapted to be raised from and lowered into the door body and having at least a pair of upright edges and a top edge, the edges of the window pane being configured to follow the contour of the window sash defined by the upright and to pH guide rail assemblies, respectively, said edges of said edges of said window pane being positioned generally outwardly of the window sash with respect to the interior of the automobile;

each of said guide rail assemblies including a shank of generally closed cross-section, an intermediate rib protruding laterally from the shank, and inner and outer peripheral flanges both lying in a common plane generally parallel to the window pane, said intermediate rib and said inner and outer peripheral flanges being connected together, the inner and outer flanges extending in opposite directions from one end of the intermediate rib such that the inner and outer flanges and the intermediate rib form substantially a T-shape, said shank being located at another end of the intermediate rib opposite to the one end thereof;

each of the guide rail assemblies including a guide rail member mounted on a respective inner peripheral flange;

a weatherstrip mounted on the outer peripheral flange;

at least one first guide shoe having a guide groove defined therein, said first guide shoe being secured to the window pane with the guide groove of said first guide shoe slidingly receiving the guide rail member of a respective one of the upright guide rail assemblies;

at least two second guide shoes each having a guide groove defined therein, said second guide shoes being secured to the window pane in spaced relation to each other with the respective guide grooves of said second guide shoes slidingly receiving the guide rail members of the other upright guide rail assembly.

3. A door assembly as claimed in claim 2, wherein said weatherstrip is of one-piece construction including a channel member having a generally U-shaped groove defined therein, said channel member being mounted on the window sash with the U-shaped groove of said channel member receiving therein said outer peripheral flange, said weatherstrip also including sealing tongue, said sealing tongue having a sealing lip engageable with an automobile body structure to seal a gap which may be formed between the body structure and the door assembly, and a sealing member engageable with a corresponding one of the upright edges of the window pane.

4. A door assembly as claimed in claim 3, wherein said guide rail member has a seal lip integrally formed therewith and slidingly and sealingly contacting the window pane.

5. A door assembly as claimed in claim 2, further comprising a garnish moulding for substantially concealing the guide rail assemblies, said garnish moulding having an engagement recess defined therein and a fitting lug integrally formed therewith, said garnish moulding being fitted to the guide rail assemblies with a protrusion of the guide rail assemblies engaging in said engagement recess and with said fitting lug firmly sandwiched between the guide rail member and the inner peripheral flange.

6. A door assembly as claimed in claim 2, wherein one of the first and second guide shoes is rigidly secured to the window pane by the use of an adhesive material while the other of the first and second guide shoes is removably secured to the window pane.

7. A door assembly as claimed in claim 6, wherein the other of the first and second guide shoes comprises a base and a generally L-sectioned guide flange integral with the base and projecting outwardly from one surface of the base, the other surface of the base having a stud integrally formed therewith and adapted to extend through a corresponding hole defined in the window pane, said guide shoe being fixed in position to the window pane by the use of a screw member threaded into the stud.

8. A door assembly as claimed in claim 2, wherein said top guide rail assembly is provided with an engagement flange integrally formed therewith and protruding a predetermined distance upwardly therefrom, and wherein that portion of an automobile body structure which confronts said engagement flange is provided with a retainer beam protruding a predetermined distance downwardly therefrom, said predetermined distances over which said engagement flange and said retainer beam project, respectively, are so selected as to permit the engagement flange to move clear of the retainer beam during the selective opening and closure of the door assembly, but as to permit the engagement flange to be trapped by the retainer beam when the door assembly tends to be sucked outwardly.

9. A door assembly as claimed in claim 2, wherein each of said guide rail members of all of the guide rail assemblies is of a generally U-shaped cross-section having a generally U-shaped groove defined therein and is covered by an elastic material, each of said guide rail members being mounted on the window sash with said U-shaped groove receiving therein said respective inner peripheral flange.

10. A door assembly as claimed in claim 9, wherein said guide rail member has a seal lip integrally formed therewith and slidingly and sealingly contacting the window pane.

* * * * *